Aug. 8, 1961  M. C. WHETSTONE  2,995,378
ATTACHMENT FOR CONVERTING A BICYCLE TO A TRICYCLE
Filed May 12, 1958

INVENTOR.
MAYNARD C. WHETSTONE
BY *Richard J. Renk*
ATTORNEY

United States Patent Office 2,995,378
Patented Aug. 8, 1961

2,995,378
ATTACHMENT FOR CONVERTING A BICYCLE
TO A TRICYCLE
Maynard C. Whetstone, 256 W. Belleview, Winona, Minn.
Filed May 12, 1958, Ser. No. 734,544
2 Claims. (Cl. 280—7.15)

The present invention relates to an attachment for bicycles, and more particularly to an improved attachment for converting a bicycle to a tricycle.

A primary object of the invention is to provide an attachment which is easily substituted for the rear wheel of a conventional bicycle to convert it to a tricycle or three wheeled vehicle without complicated attaching structures.

Another object of the invention is to provide an attachment for converting a bicycle to a tricycle which is adjustable for bicycles of various sizes and makes, and includes a novel chain tension adjustment feature.

A further object of the invention is to provide a novel clamping arrangement which enables the attachment to be easily secured to a conventional bicycle frame.

A still further object of the invention is to provide an attachment which has substantial resistance to torsional or bending stresses.

Other objects and advantages of the invention will become more apparent during the course of the following description when taken in connection with the accompanying drawings.

In the drawings, wherein like numerals are employed to designate like parts throughout the same:

Figure 1:
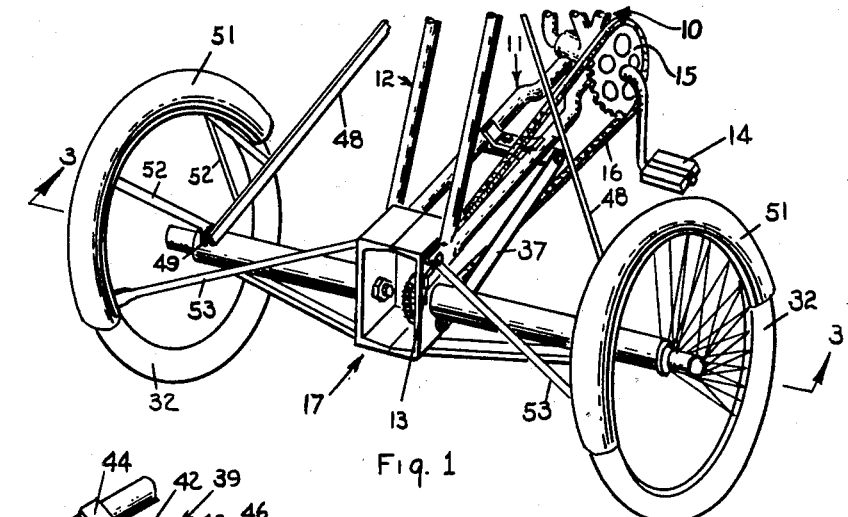
FIG. 1 is a perspective view of the rear portion of a conventional bicycle frame showing the attachment of the invention secured thereto.

Referring now to FIG. 1 of the drawings, there is shown a conventional bicycle frame 10 including a lower substantially horizontal rear framework 11 and a vertically slanted rear framework 12 which meet to form the rear forks 13. The bicycle is driven by the usual pedals 14, drive sprocket 15 and chain 16.

Figure 2:
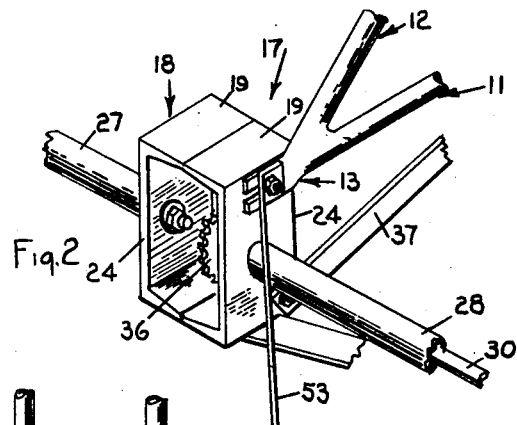
FIG. 2 is an enlarged fragmentary perspective view of the attachment.
Figure 3:
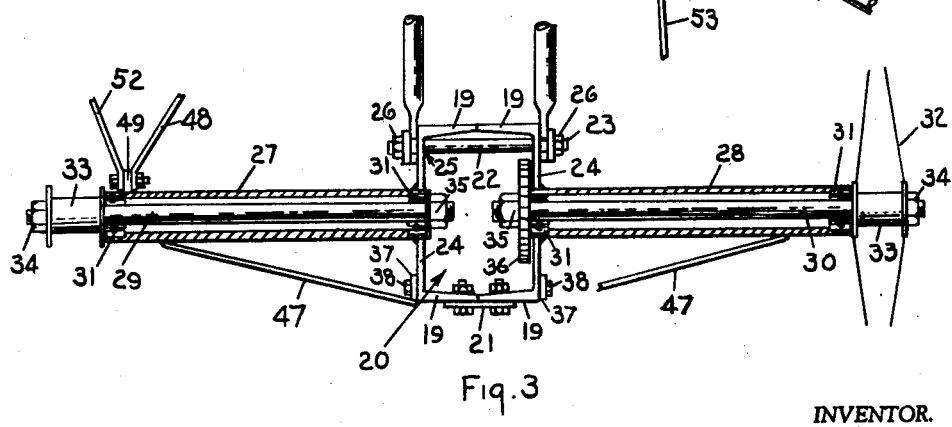
FIG. 3 is a sectional view of the attachment taken substantially along lines 3—3 of FIG. 1.

According to the present invention, to convert a conventional bicycle to a tricycle or three wheeled vehicle, there is provided an attachment, indicated generally at 17, which is substituted for the rear bicycle wheel, not shown. The attachment includes a support housing 18 adapted to be nested between the rear forks 13. In the present instance, the housing is preferably rectangular and is formed of two channel sections butted together with their legs 19 (FIG. 2) in contact with one another to define a closed frame having an opening 20 therein. The channel sections may be tied together on their lower legs or sides by a tie plate 21 (FIG. 3) and along their upper sides by a tie rod 22 threaded on its ends as at 23 and extending through appropriate holes in the bases or sides 24 of the channels. Shoulders 25 on the rod abut against the inner surfaces of the channel bases and the threaded ends 23 of the tie rod slide into the forks and are held in place by nuts 26. This arrangement securely fastens the attachment to the bicycle frame.

Extending laterally outwardly from the sides 24 of the support housing are tubular casings 27 and 28 having axles 29 and 30 (FIG. 3) journaled therein respectively, by means of bearings 31. Wheels 32 are mounted on the outer ends of the axles by means of hubs 33 and nuts 34.

The inner end of axle 29 extends into the opening 20 of the housing 18 and is held in place by a collar or nut 35. In like manner, the axle 30 extends into the opening 20 and has fixed thereon by a nut 35 a rear sprocket wheel 36 which is adapted to be connected to the main bicycle sprocket 15 through the chain 16. Thus axle 29 is able to rotate independently of the drive axle 30 and provides a differential effect when turning corners.

Figure 4:
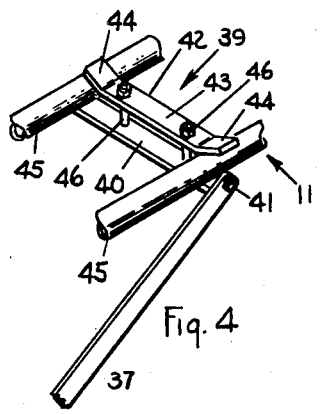
FIG. 4 is a fragmentary perspective view showing one form of a novel clamping device for securing the attachment to a bicycle frame.

As an important feature of the invention, the attachment is provided with a novel means for adjusting it to almost all sizes and makes of bicycles. Generally this means includes a pair of arms 37, each of which has one end pivotally secured by a bolt 38 to a side 24 of the housing and the other end fastened to a unique clamp 39 (FIG. 4), the latter being adapted to be secured to the lower rear frame 11.

The clamp 39 comprises a bar member 40 threaded on its ends to receive the arms 37 which are held in place by nuts 41, and a wedge plate 42 having a substantially flat central area 43 and bent or upwardly flared V-shaped ends 44. The bar 40 and wedge plate 42 are adapted to bridge between and on opposite sides of corresponding tubular frame members 45 are held in clamping engagement therewith by bolts 46. As a result, when tightened, the bolts 46 bring the plates toward one another and cause the V-shaped ends 44 of the plate 42 to wedge between and firmly grip the tubular members 45.

In use, to adjust the attachment for different bicycles, before the clamp 39 is fixed in place, the support housing 17 may be pivoted about the mounting axis of the forks 13 as defined in the present instance by the tie rod 22. If the attachment is pivoted clockwise in FIG. 1, it is obvious that the tension on the chain 16 will be increased, whereas if it is pivoted counterclockwise, the tension will be reduced. After the chain has the proper tension, the clamp 39 is tightened and the arms 37, together with the tie rod nuts 26 fixedly maintain the housing in its adjusted position. While the attachment has been shown to have the arms fastened low on the sides 24 of the support housing, it is of course clear that they may be mounted at various places on the housing, the only requirement being that both the axle axis and the point of arm attachment to the housing be off-center with respect to the fork mounting axis.

Additional rigidity for the attachment is formed by lower rib members 47 (FIG. 3) extending from the underside of the housing 17 to the outer ends of the tubular casings 27 and 28. Further rigidity is afforded by struts 48 which extend from tabs or ears 49 near the ends of the casings to a clamp (not shown) similar to the clamp 39, fastened to the sloping vertical rear frame 12. As shown in FIG. 1, rear wheel fenders 51 may be supported by fender braces 52 connected to the struts 48 and tabs 49, and also by additional braces 53 fastened to the tie rod 22.

From the foregoing, it is believed evident that the attachment of the present invention may be used with bicycles of different sizes using chains of different lengths because of the easy adjustment of the rear sprocket 36 in relation to the main drive sprocket 16. Further, because of the support housing and bracing arrangement great rigidity is obtained and the tendency for torsional stresses is reduced.

Additionally, as a major advantage, the present invention enables a conventional bicycle to be converted easily without purchasing a complete frame.

While the attachment is not limited to any particular use, it has been given acclaim by disabled people who are in need of easy transportation but who are unable to ride conventional bicycles. Further, the attachment may be put to many other uses, for example, in large manufacturing plants where rapid transportation over long distances is desirable.

It is, of course, understood that the forms of the invention disclosed herein are to be taken as the preferred embodiments thereof and that various changes, in the shape, size and arrangement of parts may be resorted to without departing from the spirit of the invention, or the scope of the following claims.

I claim:

1. A device for converting a bicycle to a tricycle, said device being adapted for attachment to the rear forks of a bicycle frame having a drive sprocket mounted in off center relation with respect thereto, said device comprising a rectangular hollow support housing for insertion between and connection to said rear forks, a casing extending laterally outwardly on each vertical side of said support housing, an axle journalled in each of said housings, a wheel on the outer end of each of said axles, a rear sprocket mounted on the inner end of one of said axles in alignment with said drive sprocket and to one side of said housing, means pivotally securing said rectangular housing to said rear forks above the axis of said axles, an arm pivotally fastened on each of said vertical sides of said rectangular housing and extending to clamping means on said bicycle frame, said arms serving to hold said housing in position after it is pivoted to properly locate said rear sprocket with respect to said drive sprocket, and rigid rib members extending diagonally away from said rectangular housing and fastened securely to the outer end of each of said casings adjacent the outer ends thereof.

2. A device for attachment to the rear forks of a bicycle frame having a drive sprocket mounted to one side thereof comprising, a rectangular support frame with an opening in the center thereof adapted to be held between said rear forks, said support frame including a pair of vertically disposed sides, a casing attached to and extending laterally outwardly from each vertical side of said support, a wheel mounted at the outer end of each of said casings, an axle journaled in at least one of said casings with the wheel at the outer end of said casing being mounted on the outer end of said axle, a rear sprocket mounted on the inner end of said axle and in alignment with said drive sprocket, means for pivotally mounting said rectangular support between said forks, an adjusting arm pivotally fastened to said support and spaced from said last named means, said adjusting arm being adapted to be fastened to the bicycle frame and serving to hold the support in position after the latter is pivoted between said forks to properly locate the rear sprocket with respect to the bicycle drive sprocket.

References Cited in the file of this patent

UNITED STATES PATENTS

| 636,570 | Shugers | Nov. 7, 1899 |
| 1,374,513 | Mosher et al. | Apr. 12, 1921 |
| 1,856,255 | Johnson | May 3, 1922 |
| 2,486,583 | Walklet | Nov. 1, 1949 |

FOREIGN PATENTS

| 2,766 | Great Britain | of 1892 |